(12) United States Patent
Iida (10) Patent No.: US 8,011,341 B2
(45) Date of Patent: Sep. 6, 2011

(54) VEHICLE ENGINE STRUCTURE

(75) Inventor: Akira Iida, Toyota (JP)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 484 days.

(21) Appl. No.: 12/300,205

(22) PCT Filed: Nov. 16, 2006

(86) PCT No.: PCT/IB2007/004246
§ 371 (c)(1),
(2), (4) Date: Nov. 10, 2008

(87) PCT Pub. No.: WO2008/062312
PCT Pub. Date: May 29, 2008

(65) Prior Publication Data
US 2009/0199810 A1  Aug. 13, 2009

(30) Foreign Application Priority Data
Nov. 21, 2006   (JP) .................................. 2006-313817

(51) Int. Cl.
*F01M 1/02* (2006.01)
(52) U.S. Cl. ................ 123/195 R; 123/195 C; 180/240; 180/248; 184/106
(58) Field of Classification Search ............. 123/195 R, 123/195 C, 195 A, 195 S, 1 A, 27 A, 90.34, 123/196 M, 41.42; 184/106; 180/248, 240
See application file for complete search history.

(56) References Cited

U.S. PATENT DOCUMENTS

| | | | |
|---|---|---|---|
| 3,213,958 A | 10/1965 | Muller | |
| 4,270,497 A * | 6/1981 | Valerio | 123/195 C |
| 4,394,853 A * | 7/1983 | Lopez-Crevillen et al. | 123/195 C |
| 4,770,276 A * | 9/1988 | Takubo | 184/106 |
| 5,064,017 A * | 11/1991 | Kikuchi et al. | 180/248 |
| 5,794,443 A * | 8/1998 | Shimizu | 60/456 |
| 6,588,486 B1 * | 7/2003 | Takayama et al. | 164/113 |
| 6,640,766 B2 * | 11/2003 | Furuya et al. | 123/195 R |
| 7,100,562 B2 * | 9/2006 | Terada et al. | 123/195 R |
| 2002/0112691 A1 * | 8/2002 | Furuya et al. | 123/195 R |
| 2005/0081815 A1 * | 4/2005 | Ohta et al. | 123/195 C |
| 2006/0102159 A1 * | 5/2006 | Hommes | 123/572 |
| 2006/0130801 A1 * | 6/2006 | Suzuki et al. | 123/196 R |
| 2006/0213462 A1 * | 9/2006 | Horing et al. | 123/41.23 |

FOREIGN PATENT DOCUMENTS

| | | |
|---|---|---|
| JP | 59-054718 A | 3/1984 |
| JP | 6-144037 A | 5/1994 |

(Continued)

*Primary Examiner* — Michael Cuff
*Assistant Examiner* — Long Tran
(74) *Attorney, Agent, or Firm* — Sughrue Mion, PLLC (57) ABSTRACT

An oil pan (20) includes: a pair of oil pan rail portions (21a, 21b), which are spaced apart from each other under an engine body (10a), and are fastened to the engine body (10a); a pair of side wall portions (22a, 22b), facing each other, which are formed integrally with the oil pan rail portions (21a, 21b); and a cylindrical portion (23), which surrounds a driving axle (19L, 19R) passed through the oil pan (20), and is integrally joined with the pair of side wall portions (22a, 22b) near the pair of oil pan rail portions (21a, 21b). At least one axial end (23a, 23b) of the cylindrical portion (23), an upper half portion (23c) of the cylindrical portion (23) positioned over the driving axle (19L, 19R) is thickened upward up to the level near the upper surface of the oil pan rail portion (21a, 21b).

11 Claims, 7 Drawing Sheets

FOREIGN PATENT DOCUMENTS

| | | |
|---|---|---|
| JP | 8-100707 A | 4/1996 |
| JP | 11-101117 A | 4/1999 |
| JP | 11-229841 A | 8/1999 |
| JP | 2006-207400 A | 8/2006 |
| WO | 91/19619 A1 | 12/1991 |
| WO | 99/50005 A1 | 10/1999 |

* cited by examiner

(PLAN VIEW)

VEHICLE ENGINE STRUCTURE

BACKGROUND OF THE INVENTION

1. Field of the Invention

The invention relates to a vehicle engine structure, and more specifically to a vehicle engine structure in which a driving axle for driving a driving wheel is passed through an oil pan mounted on the bottom of an engine.

2. Description of the Related Art

Vehicle engine structures of this kind are adopted in vehicles or the like in which front wheels are driving wheels, such as, in particular, four-wheel-drive vehicles. Japanese Patent Application Publication No. 2006-207400 (JP-A-2006-207400) and Japanese Patent Application Publication No. 11-101117 (JP-A-11-101117) describe vehicle engine structures in which a driving axle for driving a front wheel is horizontally passed through an oil pan mounted on the bottom of an engine.

With regard to four-wheel-drive vehicles, Japanese Patent Application Publication No. 11-229841 (JP-A-11-229841) and Japanese Patent Application Publication No. 8-100707 (JP-A-8-100707) describe vehicle engine structures in which a driving axle for driving a front wheel is longitudinally, that is, in the vehicle lengthwise direction, passed through an oil pan under a longitudinally-mounted engine. In such a vehicle, the power output from the engine through a transmission is distributed to the front wheel side and the rear wheel side by a transfer unit. The power is then transmitted to the rear wheels through a rear differential gear and driving axles, and transmitted to the front wheels through a front differential gear and driving axles.

A longitudinally-mounted engine that is used as an outboard motor or the like of machines other than vehicles, and that has a through hole formed through an oil pan in a substantially vertical direction, through which a drive shaft for driving a screw propeller is passed is also available.

Figure 7:
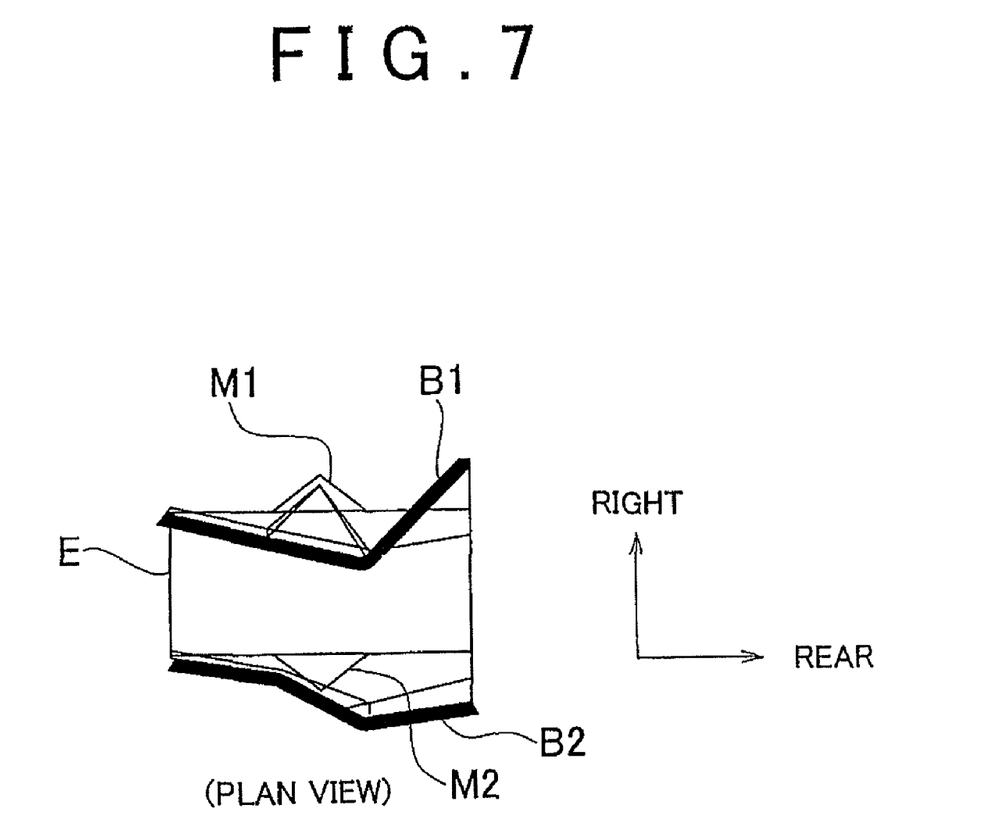
FIG. 7 is a diagram for explaining a problem of related art.

FIG. 7 is a diagram showing an engine frame, an engine mount, and bottom rails of a V-type engine. In FIG. 7, E designates the engine frame, M1 and M2 designate the engine mount, and B1 and B2 designate the bottom rails. The right and rear directions in FIG. 7 are the right and rear directions with respect to the direction of travel of the vehicle.

With regard to the above-described vehicle engine structure, there has been a problem that, when the bottom rail portions are significantly, bendingly deformed near the longitudinal centre, at which the bottom rail portions of the engine body are supported by the engine mount, due to the force applied to a crankshaft bearing, such as when vibration including a vibration component of the engine frame vibration mode as shown in FIG. 7 is apt to occur because a V-type engine is used, the amplitude of vibration of the oil pan can become large, and the emitted sound of which the source is the oil pan can therefore becomes loud.

Specifically, when the engine operates, the force produced by combustion is transmitted to a piston, a connecting rod, and a crankshaft, vibrating the crankshaft bearing. For this reason, the oil pan, which is positioned near the crankshaft bearing and whose area is large, is vibrated in the lateral direction as shown in FIG. 7, thereby generating sound. In this way, the oil pan tends to become a noise emission source.

As a countermeasure for this, structural improvement can be carried out, such as rigidity enhancement near the point to which the force applied to the crankshaft bearing is transmitted. However, provision of an additional member, such as a separate ladder-like frame, leads to significant increase in mass of the engine and/or increase in cost for manufacturing the engine.

Alternatively, instead of enhancing the rigidity, a measure to reduce vibration by reducing the bearing clearance can be adopted. However, this measure can lead to worsening of fuel economy and/or cost increase due to increase in friction. In addition, because it is necessary to prevent seizure, reduction of the clearance is limited, and the effect of reducing vibration is therefore limited. Moreover, it becomes necessary to control the unevenness of quality, which results in increase in cost.

SUMMARY OF THE INVENTION

An object of the invention is to provide a vehicle engine structure with which it is possible to surely restrict vibration of an oil pan, which is a potential noise source, in a certain direction, and to reduce emitted sound, without significant increase in mass of the engine or increase in cost for manufacturing the engine.

A vehicle engine structure according to the invention includes: (a) a body of an engine; and (b) an oil pan, supported under the engine body, through which a driving axle driven by the engine to drive a driving wheel of a vehicle is passed. The oil pan includes: a pair of oil pan rail portions, which are spaced apart from each other, and are fastened to the engine body; a pair of side wall portions, facing each other, which are formed integrally with the oil pan rail portions under the oil pan rail portions; and a cylindrical portion, which surrounds the driving axle, and is integrally joined with the pair of side wall portions near the pair of oil pan rail portions. At least one axial end of the cylindrical portion, an upper half portion of the cylindrical portion positioned over the driving axle is thickened upward up to the level near the upper surface of an adjacent one of the oil pan rail portions.

With this configuration, the at least one axial end of the cylindrical portion of the oil pan through which the driving axle is passed is located near the oil pan rail portion fastened to the bottom of the engine body, and functions as a reinforcement member for restricting deformation of the oil pan rail portion. Thus, it is possible to surely restrict vibration of the oil pan without significant increase in mass of the engine or increase in cost for manufacturing the engine. In this specification, "the upper half portion is thickened upward" means that the vertical centre of the cylindrical portion is offset upward above the centre of the through hole through which the driving axle is passed, and the upper half portion is thicker than the lower half portion with respect to the central axis of the through hole of the cylindrical portion. However, the cross-sectional shape of the cylindrical portion is arbitrary.

In the above vehicle engine structure, at a position near the one end of the cylindrical portion, an outer profile of a cross section of the cylindrical portion may have one of a substantially elliptical shape, a shape obtained by reducing a lateral width of the upper half portion of the substantially elliptical shape, and a shape in which a part corresponding to the upper half portion has a substantially rectangular shape of which corners have a certain radius, and in which a part corresponding to the lower half portion has a substantially semicircular shape.

In the above vehicle engine structure, the thickness of the upper half portion of the cylindrical portion in a vertical direction may be greater than the thickness of the lower half portion of the cylindrical portion in the vertical direction.

In the above vehicle engine structure, the lateral width of a cross section of a thickened portion of the upper half portion may be equal to or less than the maximum lateral width of the cylindrical portion.

In the above vehicle engine structure, the upper half portion may have an inclined surface inclined from near the upper surface of the adjacent one of the oil pan rail portions downwardly toward an axially centre portion of the cylindrical portion.

With this configuration, the oil pan rail portions are reinforced and connected by the cylindrical portion that functions as if it is a beam of a ladder. Accordingly, even when bending deformation of the bottom rails under the engine in the lateral direction tends to become large near the engine mount portions, it is possible to effectively restrict such deformation.

In the above vehicle engine structure, the inclination angle of the inclined surface with respect to the upper surface of the adjacent one of the oil pan rail portions may be larger at a position close to the one end of the cylindrical portion than the inclination angle at a position close to the axially centre portion of the cylindrical portion.

With this configuration, it is possible to minimise the amount of padding to the upper half portion of the cylindrical portion, and at the same time, cause the cylindrical portion to provide a required degree of reinforcement.

In the above vehicle engine structure, the inclination angle of the inclined surface with respect to the upper surface of the adjacent one of the oil pan rail portions may be smaller at a position close to the one end of the cylindrical portion and at a position close to the axially centre portion of the cylindrical portion than the inclination angle in an inclined area between the one end of the cylindrical portion and the axially centre portion of the cylindrical portion.

With this configuration, it is possible to cause the cylindrical portion to provide a sufficient degree of reinforcement.

In the above vehicle engine structure, an extension plane extended from the one end of the cylindrical portion toward the axially centre portion of the cylindrical portion at the same level as the level of the upper surface of the adjacent one of the oil pan rail portions may be provided, and the inclined surface may be formed so as to smoothly join the extension plane.

With this configuration, it is possible to cause the cylindrical portion to provide a sufficient degree of reinforcement.

In the above vehicle engine structure, the cross-sectional shape of the inclined surface taken on a plane perpendicular to the axis of the cylindrical portion at a position on the inner side at which the inclined surface joins the outer surface of the upper half portion may be a substantially arc shape, the cross-sectional shape of the inclined surface taken on a plane perpendicular to the axis of the cylindrical portion at a position on the outer side close to the oil pan rail portion may be a substantially rectangular shape of which corners have a certain radius, and, between the inner side and the outer side, from the centre portion of the cylindrical portion toward the oil pan rail portion, the cross-sectional shape of the inclined surface may gradually vary from the substantially arc shape to the substantially rectangular shape of which corners have the certain radius.

In the above vehicle engine structure, the engine may be a longitudinally-mounted engine, and the driving axle may extend from a differential gear disposed on a side of the engine toward the driving wheel of the vehicle.

With this configuration, even when a longitudinally-mounted engine, a longitudinally-mounted V-type engine, for example, is used, vibration of the oil pan is restricted, and the emitted sound is therefore restricted.

In the above vehicle engine structure, the oil pan may include: a block portion in which the pair of oil pan rail portions, the pair of side wall portions, and the cylindrical portion are integrally formed of the same material as that for a cylinder block of the engine body; and a cover portion made of a steel plate, which covers the bottom of the block portion.

With this configuration, the block portion effectively prevents increase in the amplitude of vibration of the oil pan, and it is therefore possible to prevent emitted sound from becoming loud.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF EMBODIMENTS

An embodiment of the invention will be described below with reference to drawings.

FIGS. 1A, 1B, 2 and 3 show a vehicle engine structure according to a first embodiment of the invention, which is an example in which the invention is applied to a four-wheel-drive vehicle. However, the application to which the first embodiment is applied is not limited to the four-wheel-drive vehicle.

In the vehicle engine structure of the first embodiment, the power output from an engine 10 through a transmission 11 (see FIG. 2) is distributed to the front wheel side (front wheels 14R and 14L) and the rear wheel side (rear wheels 15R and 15L) through a transfer unit 13 and propeller shafts 13a and 13b. The power is then transmitted to the rear wheels 15L and 15R through a rear differential gear 16 and driving axles 17L and 17R, and transmitted to the front wheels 14L and 14R through a front differential gear 18 and driving axles 19L and 19R.

The engine 10 is a so-called longitudinally-mounted 4-cycle petrol (gasoline) engine, which, although details thereof are not shown, is a 90-degree V-8 engine, for example. The fuel may be ethanol or gas fuel.

One of the driving axles 19L and 19R, the right driving axle 19R, for example, that extend from the front differential gear 18, mounted on the front side of the engine 10, to the front wheels 14L and 14R is passed through an oil pan 20 mounted on the bottom of the engine 10.

Specifically, the oil pan 20 includes: a pair of oil pan rail portions 21a and 21b, which are spaced apart from each other in the lateral direction under an engine body 10a, and are fastened to the engine body 10a with a plurality of bolts (not shown); a pair of side wall portions 22a and 22b, which are formed integrally with the oil pan rail portions 21a and 21b under the oil pan rail portions 21a and 21b, and face each other; and a cylindrical portion 23, which surrounds the driving axle 19R passed through the oil pan 20, and is integrally joined with the pair of side wall portions 22a and 22b near the pair of oil pan rail portions 21a and 21b.

Figure 1A:
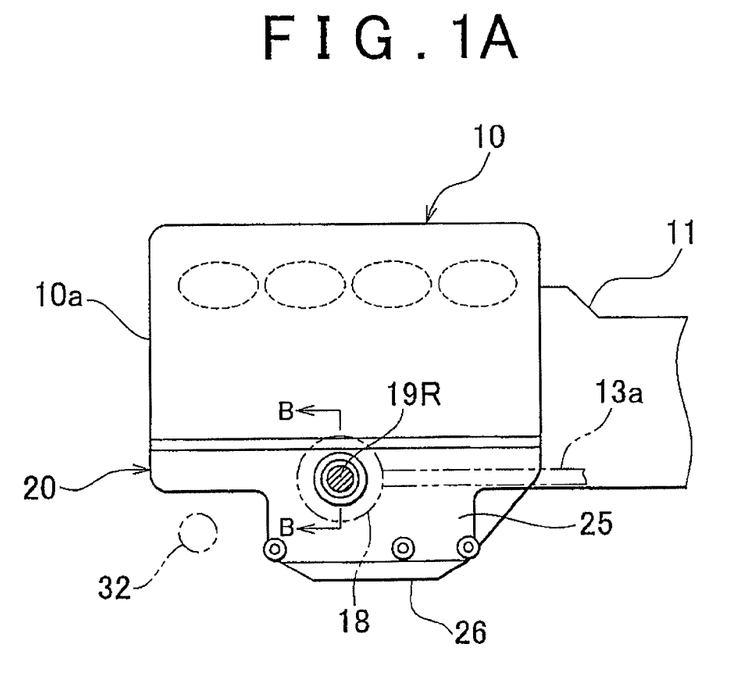
FIG. 1A is a schematic side view showing a vehicle engine structure according to a first embodiment of the invention.
Figure 1B:
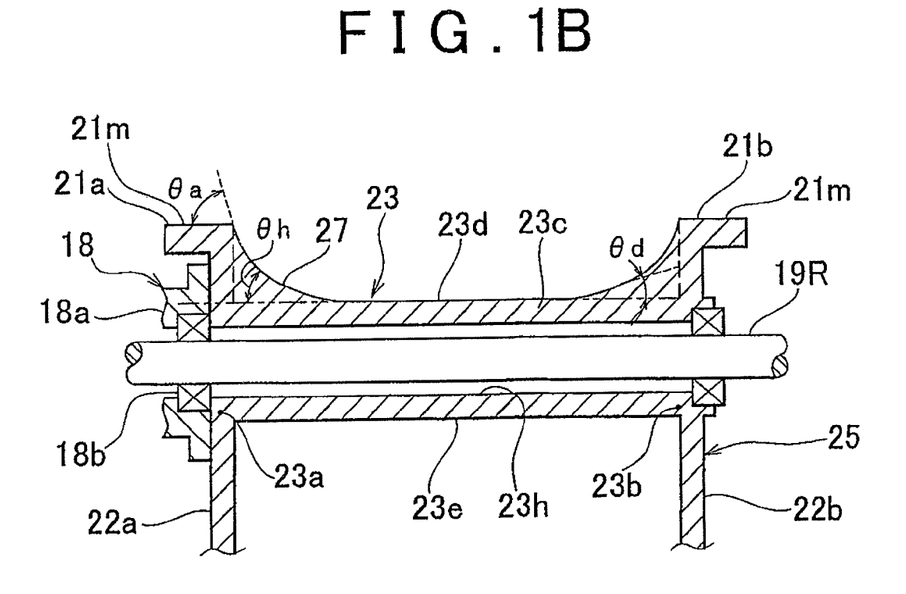
FIG. 1B is a sectional view on arrow B-B of FIG. 1A, showing the vehicle engine structure according to the first embodiment of the invention.
Figure 3:
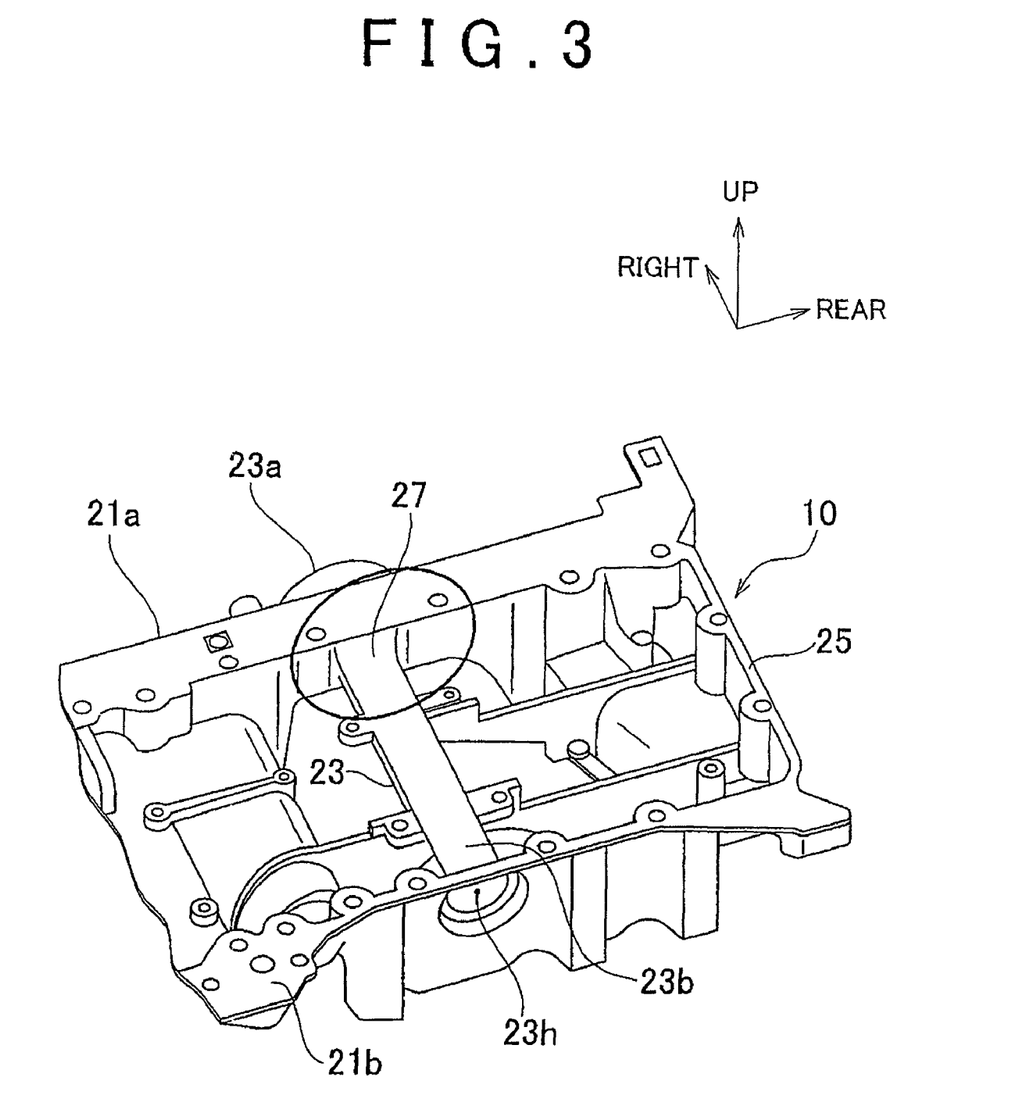
FIG. 3 is a perspective view of an oil pan in the vehicle engine structure according to the first embodiment of the invention.

As shown in FIGS. 1A, 1B and 3, the oil pan 20 includes: a block portion 25, in which the pair of oil pan rail portions 21a and 21b, the pair of side wall portions 22a and 22b, and the cylindrical portion 23 are integrally formed of the same material as that of a cylinder block (not designated by reference numeral) of the engine body 10a, such as die-cast aluminum alloy; and a cover portion 26 made of a coated steel plate, which is fastened to the block portion 25 with bolts so as to cover the bottom of the block portion 25.

An upper half portion 23c positioned above the central axis of a through hole 23h through which the driving axle 19R is passed is, as compared to a lower half portion 23e positioned below the central axis of the through hole 23h, formed thick in the vertical direction, that is, thickened upward up to the level near the upper surface of the oil pan rail portion 21a or the oil pan rail portion 21b, or the upper surfaces of the oil pan rail portions 21a and 21b, at least one end portion of the cylindrical portion 23 in the axial direction, that is, at a right end portion 23a or a left end portion 23b, or both the right and left end portions (hereinafter referred to as "both end portions") 23a and 23b. Although, in the following description, the case where both end portions 23a and 23b are formed thick will be described, the invention is not limited to this case.

Specifically, near both end portions 23a and 23b of the cylindrical portion 23, the cross section of the cylindrical portion 23 has an oblong shape of which major axis lies along the vertical direction, and has the centre, or the centroid, above the central axis of the through hole 23h. The cross section may have a substantially elliptical outer profile, for example.

The upper half portion 23c of the cylindrical portion 23 that is positioned over the driving axle 19R has an inclined surface 27, which is inclined downwardly toward an axially centre portion (hereinafter referred to as the centre portion) 23d of the cylindrical portion 23 from near the upper surfaces of the oil pan rail portions 21a and 21b. The cross section of the inclined surface 27, which is taken on the plane perpendicular to the axis of the cylindrical portion 23, on the inner side of the inclined surface 27 where the inclined surface 27 joins the outer surface of the centre portion 23d, has a substantially arc shape. The cross section of the inclined surface 27 on the outer side thereof near the oil pan rail portion 21a (21b) has a substantially rectangular shape of which corners have a certain radius. Between these sides, from the centre portion 23d of the cylindrical portion 23 toward the oil pan rail portion 21a (21b), the cross section of the inclined surface 27 gradually varies from the substantially arc shape to the substantially rectangular shape of which corners have a certain radius.

The shape of the cross section of the cylindrical portion 23 is arbitrary. However, instead of a substantially crescent shape, a convex shape such that the upper half portion 23c is thicker than the lower half portion 23e in the vertical direction is preferable as the shape of the cross section of the upper half portion 23c. Although the horizontal width of the upwardly convex upper half portion 23c is preferably close to the lateral width (horizontal diameter) of the cylindrical portion 23, the former width may be less than the latter width. For example, the upper half portion 23c may have a rib-like convex portion, that is, the upper half portion 23c may be provided with a rib.

As shown in FIG. 1B, the inclination angle $\theta$ of the inclined surface 27 with respect to a joining surface 21m of the oil pan rail portion 21a (21b) on which the oil pan rail portion 21a (21b) is joined to the bottom of the engine body 10a, or with respect to a line parallel to the joining surface 21m (the chain double-dotted line in figures, for example) is large near both end portions 23a and 23b of the cylindrical portion 23, and decreases toward the centre portion 23d of the cylindrical portion 23. More specifically, the inclination angle $\theta$ of the inclined surface 27 with respect to the joining surface 21m is a large angle $\theta a$ close to 90° near both end portions 23a and 23b of the cylindrical portion 23, and is an angle $\theta d$ close to 0° near the centre portion 23d. Between the centre portion 23d and both end portions 23a and 23b of the cylindrical portion 23, the angle $\theta$ is between the angles $\theta a$ and $\theta d$. Specifically, the angle $\theta$ is large near both end portions 23a and 23b of the cylindrical portion 23, and gradually decreases toward the centre portion 23d ($\theta d < \theta h < \theta a$).

In this way, in the oil pan 20, the upper half portion 23c of the cylindrical portion 23, which is the portion over the axle hole, is smoothly joined to the oil pan rail portions 21a and 21b, which provides a reliable reinforcement function for the cylindrical portion 23, and achieves enhancement of rigidity.

Figure 2:
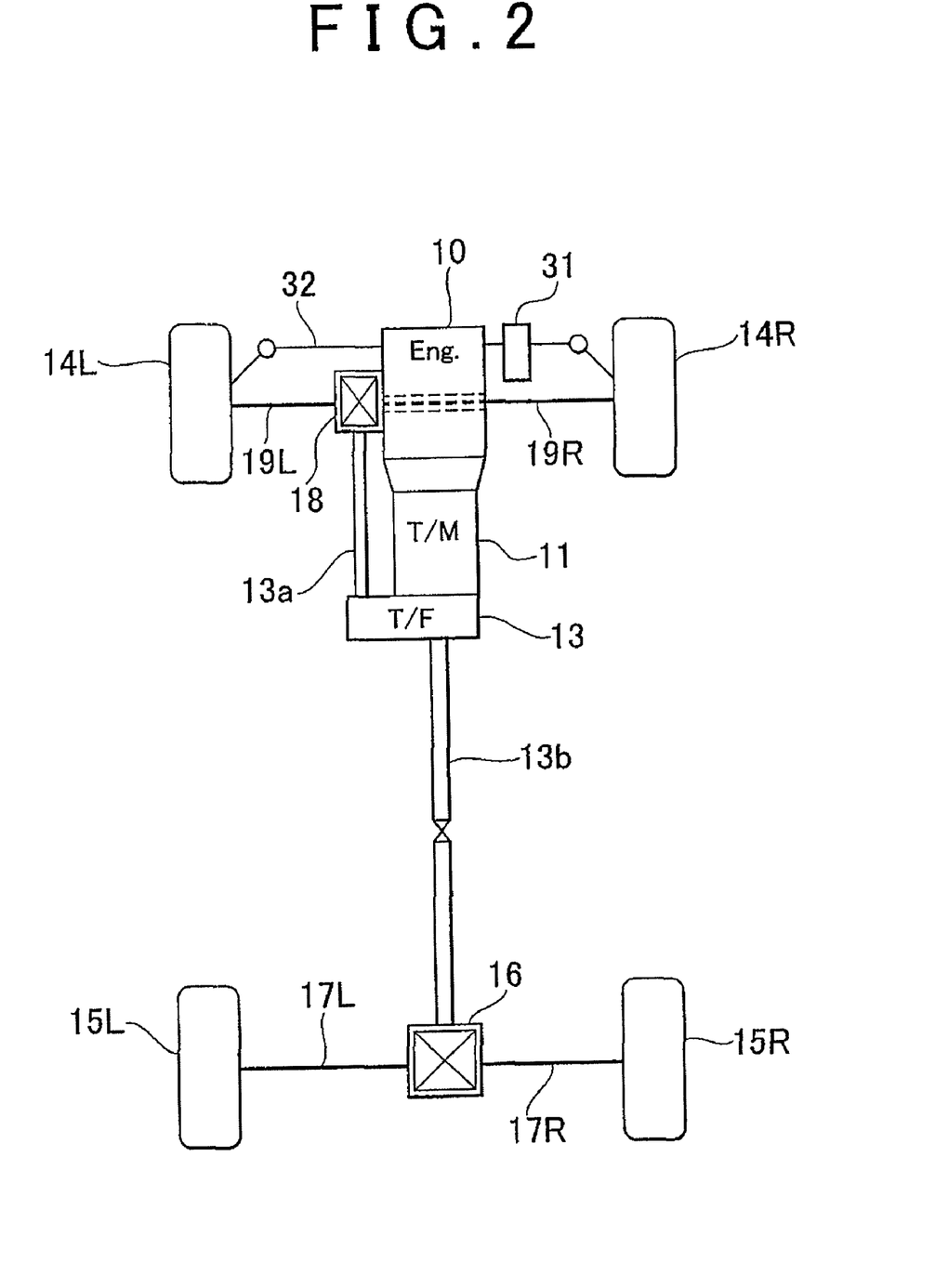
FIG. 2 is a plan view showing a schematic configuration of a power train of a vehicle related to the first embodiment of the invention.

Referring to FIGS. 1A, 1B and 2, a steering gear 31 and a steering rack 32, which function as a steering mechanism of the vehicle, are provided below a front portion of the engine 10, and the front wheels 14L and 14R are steered by the steering mechanism. The front differential gear 18 has a case 18a that is fastened to the side wall portion 22a of the oil pan 20 with bolts (not shown), and a bearing 18b that is supported by the case 18a, and rotatably supports the driving axle 19R.

According to the vehicle engine structure of the first embodiment configured as described above, the end portions 23a and 23b of the cylindrical portion 23 of the oil pan 20 through which the driving axle 19R is passed are located near the oil pan rail portions 21a and 21b fastened to the bottom of the engine body 10a, and function as reinforcement members for restricting deformation of the oil pan rail portions 21a and 21b. Thus, it is possible to surely restrict vibration of the oil pan 20 without significant increase in mass of the engine 10 or increase in cost for manufacturing the engine 10.

In particular, when the engine 10 is a longitudinally-mounted engine, the driving axles 19L and 19R extend from the differential gear 18 disposed on the side of the engine 10 to the front wheels 14L and 14R. In this case, by virtue of the invention, even when a longitudinally-mounted V-type engine is used, for example, vibration of the oil pan 20 is restricted, and the emitted sound is therefore restricted.

The upper half portion 23c of the cylindrical portion 23 that is positioned over the driving axle 19R has the inclined surface 27 inclined from near the joining surfaces 21m downwardly toward the centre portion 23d of the cylindrical portion 23. Thus, the cylindrical portion 23 functions as if it is a beam of a ladder for the right and left oil pan rail portions 21a and 21b, and the right and left oil pan rail portions 21a and 21b are connected with each other near the longitudinally centre portions of the oil pan rail portions 21a and 21b. Accordingly, even when bending deformation of the bottom rails under the engine in the lateral direction tends to become large near the engine mount portions, it is possible to effectively restrict such deformation.

In addition, the inclination angle θ of the inclined surface 27 with respect to the joining surface 21m, or with respect to a line parallel to the joining surface 21m is large near both end portions 23a and 23b of the cylindrical portion 23, and decreases toward the centre portion 23d of the cylindrical portion 23 (θd<θh<θa in FIG. 1B), so that it is possible to minimise the amount of padding to the upper half portion 23c of the cylindrical portion 23, and at the same time, cause the cylindrical portion 23 to provide a required degree of reinforcement.

Figure 4:
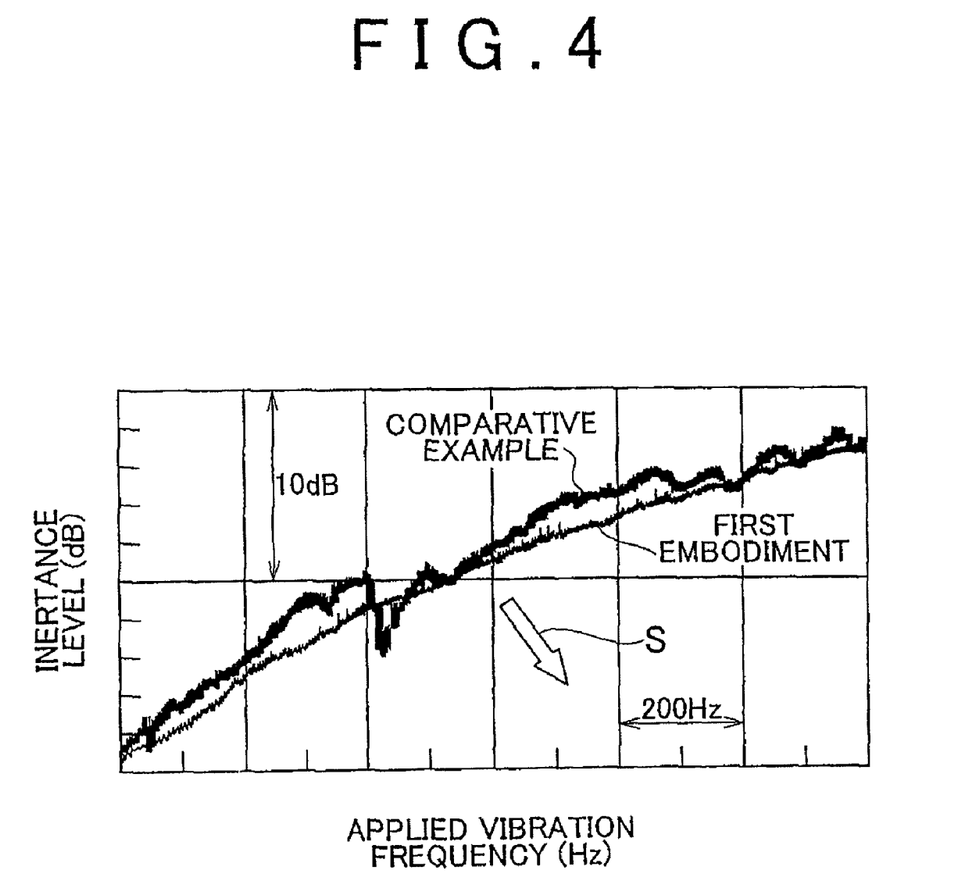
FIG. 4 shows vibration characteristics, which shows the effect of enhancing rigidity of the oil pan in the vehicle engine structure according to the first embodiment of the invention, where the ordinate and abscissa axes indicate inertance level and applied vibration frequency, respectively.

FIG. 4 shows vibration characteristics, which shows the effect of enhancing rigidity of the oil pan 20 when the joining portion at which the cylindrical portion 23 and the part of the oil pan rail portion 21a encircled by an ellipse in FIG. 3, which part is positioned on the one end portion 23a-side of the cylindrical portion 23, are joined is vibrated. In FIG. 4, the ordinate and abscissa axes indicate inertance level (dB) and applied vibration frequency (Hz), respectively. When A is the acceleration of the evaluation point that occurs when vibration of a predetermined amplitude F is applied, the inertance level (or accelerance) is expressed by A/F. In FIG. 4, the graph representing a comparative example is obtained when the upper half portion 23c of the cylindrical portion 23 is not padded. The graph representing the first embodiment shows a number of small peak variations, and indicates high rigidity.

In FIG. 4, the further the graph shifts in the direction indicated by the arrow S, the higher the rigidity of the test piece is. Thus, with the vehicle engine structure of the first embodiment, achieved is the effect of enhancing the rigidity proven by the inertance reduction of about 2 dB as compared to the comparative example in which no measure to enhance rigidity is taken.

Thus, the cylindrical portion 23 of the oil pan 20 through which the driving axle 19R is passed is positioned near the oil pan rail portion 21a fastened to the bottom of the engine body 10a, and functions as a member restricting deformation of the oil pan rail portion 21a in the lateral direction.

In addition, according to the vehicle engine structure of the first embodiment, it is not required to provide an additional member, such as a separate ladder-like frame. For this reason, neither significant increase in mass of the engine nor increase in cost for manufacturing the engine is caused. It is also not required to reduce the amount of clearance between the crankshaft and the crankshaft bearing. Thus, neither worsening of fuel economy nor cost increase due to increase in friction is caused. Needless to say, additional control of the unevenness of quality, which can cause increase in cost, is not required.

Accordingly, with the vehicle engine structure of the first embodiment, it is possible to surely restrict vibration of the oil pan 20 without significant increase in mass of the engine 10 or increase in cost for manufacturing the engine 10. Thus, it is possible to surely prevent increase in noise of which the source is the oil pan 20.

In addition, because the vehicle engine structure of the first embodiment includes: the block portion 25 in which the pair of oil pan rail portions 21a and 21b, the pair of side wall portions 22a and 22b, and the cylindrical portion 23 are integrally formed of the same material as that for the cylinder block of the engine body 10a; and the cover portion 26, made of a steel plate, that covers the bottom of the block portion 25, the block portion 25 effectively prevents increase in the amplitude of vibration of the oil pan 20, and it is therefore possible to prevent emitted sound from becoming loud.

Figure 5A:
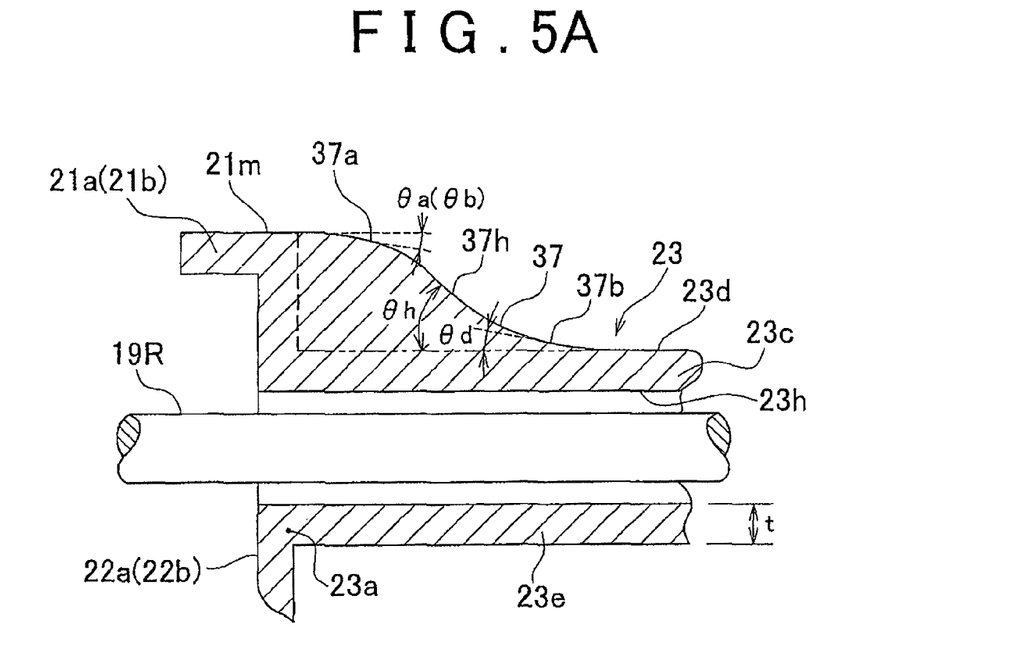
FIGS. 5A to 5C are main part sectional views showing a vehicle engine structure according to a second embodiment of the invention.
Figure 5B:
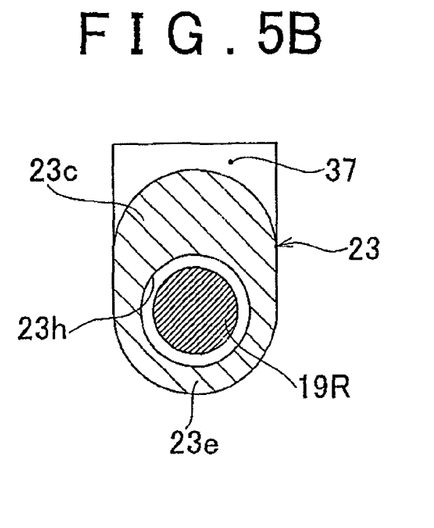
Figure 5C:
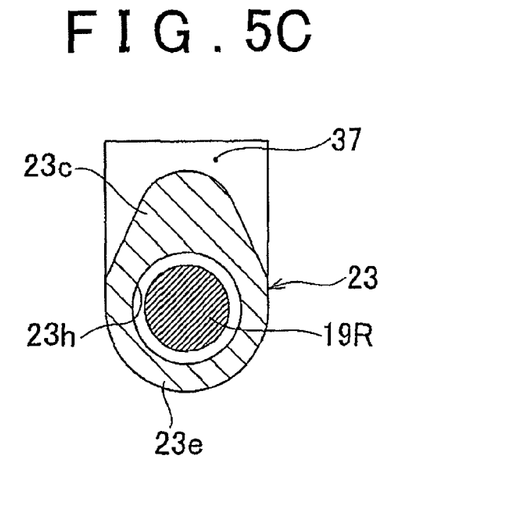

FIG. 5 is a sectional view of a portion near a cylindrical portion of an oil pan, which is part of a vehicle engine structure according to a second embodiment of the invention.

The second embodiment is similar to the above-described first embodiment, except the form of the cylindrical portion of the oil pan near the end portions of the cylindrical portion. Thus, similar portions are indicated by the same reference numerals as those of the corresponding portions of the first embodiment, and description thereof is omitted. In the following description, differences between the first and second embodiments will be described.

FIG. 5A is a sectional view illustrating a portion near one end portion. The other end portion has a similar configuration. However, the invention is not limited to the case where each end portion has a similar configuration. The upper half portion 23c of the cylindrical portion 23 that is positioned over the driving axle 19R has an inclined surface 37, which is inclined from near the upper surfaces of the oil pan rail portions 21a and 21b downwardly toward the centre portion 23d of the cylindrical portion 23.

The inclination angle θ of the inclined surface 37 with respect to the joining surface 21m is large near both end portions 23a and 23b of the cylindrical portion 23, and decreases toward the centre portion 23d of the cylindrical portion 23. Specifically, the inclination angle θ of the inclined surface 37 with respect to the joining surface 21m, or with respect to a line parallel to the joining surface 21m (the chain double-dotted line in FIG. 5A, for example) is small near both end portions 23a and 23b and near the centre portion 23d, and is large in an inclined area 37h between the centre portion 23d and both end portions 23a and 23b (θa<θh, θb<θh, θd<θh in FIG. 5A).

The inclination angle θ gradually decreases near both end portions 37a and 37b of the inclined surface 37, so that the inclined surface 37 is smoothly joined with the joining surfaces 21m and with the centre portion 23d of the cylindrical portion 23 with no large step formed.

FIG. 5A is a sectional view of the cylindrical portion 23. It is preferable that, in FIG. 5A, the curvature radius of the smoothly joining portions of the inclined surface 37 be greater than the thickness t of the lower half portion of the cylindrical portion 23, and greater than the thickness of the centre portion 23d.

The cross-sectional shape of the cylindrical portion 23 on the plane perpendicular to the axis of the cylindrical portion 23 near the end portion 23a (23b) of the cylindrical portion 23 is a vertically long shape that is offset so that the centre is located above the central axis of the through hole 23h. The cross-sectional shape has a substantially elliptical outer profile as shown in FIG. 5B, or, as shown in FIG. 5C, an outer profile in which the lateral width of the upper half portion 23c is less than that of the shape shown in FIG. 5B.

The upper half portion 23c may be thickened upward as compared to the lower half portion 23e also in the centre portion 23d of the cylindrical portion 23.

The second embodiment also makes it possible to cause the cylindrical portion 23 of the oil pan 20 to provide a sufficient degree of reinforcement with the amount of padding to the upper half portion 23c of the cylindrical portion 23 kept small.

The inclination angle θ of the inclined surface 37 with respect to the joining surface 21m, or with respect to a line parallel to the joining surface 21m (the chain double-dotted line in FIG. 5A, for example) is small near both end portions 23a and 23b and near the centre portion 23d of the cylindrical portion 23, and is large in the inclined area 37h between the centre portion 23d and the end portions 23a and 23b, so that it is possible to cause the cylindrical portion 23 to provide a sufficient degree of reinforcement.

The outer end portion of the inclined surface 37 near the joining surface 21*m* of the oil pan tail portion 21*a* (21*b*) may have an extension plane formed flush with the joining surface 21*m*, and the outer end portion of the inclined surface 37 may sharply transit from the extension plane to the inclined surface in the inclined area 37*h*. In this case, the inclination angle θ of the inclined surface 37 with respect to the joining surface 21*m* is large near both end portions 23*a* and 23*b* of the cylindrical portion 23, and decreases toward the centre portion 23*d* of the cylindrical portion 23. In addition, the upper half portion 23*c* of the cylindrical portion 23 may be made thicker, as compared to the lower half portion 23*c*, near the centre portion 23*d* of the cylindrical portion 23.

Figure 6A:
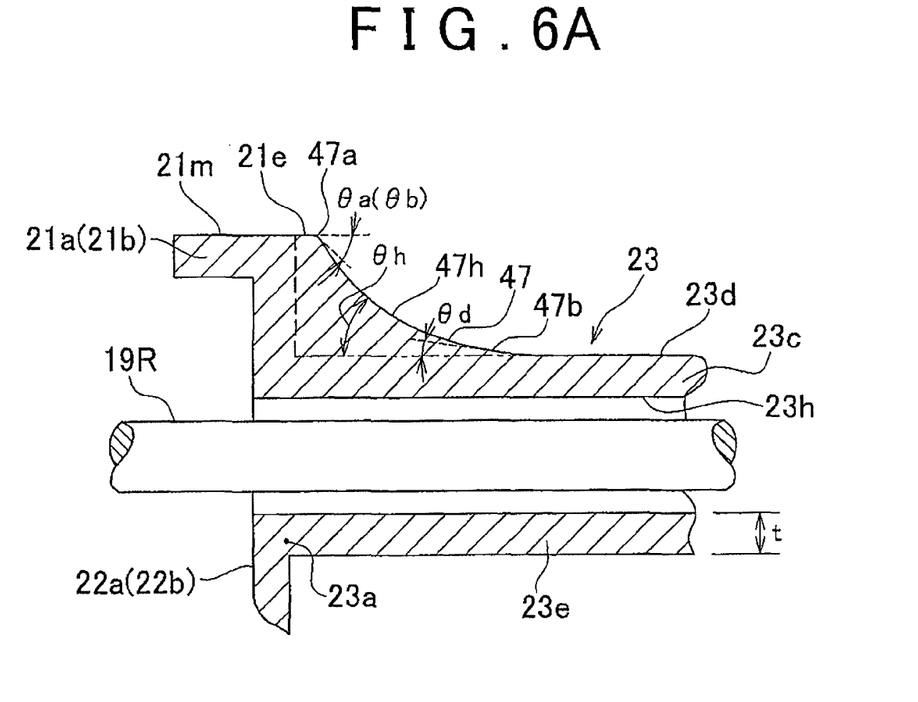
FIGS. 6A to 6C are main part sectional views showing a vehicle engine structure according to a third embodiment of the invention.
Figure 6B:
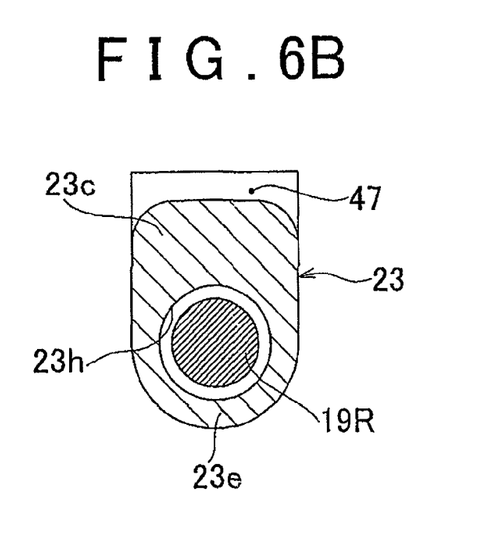
Figure 6C:
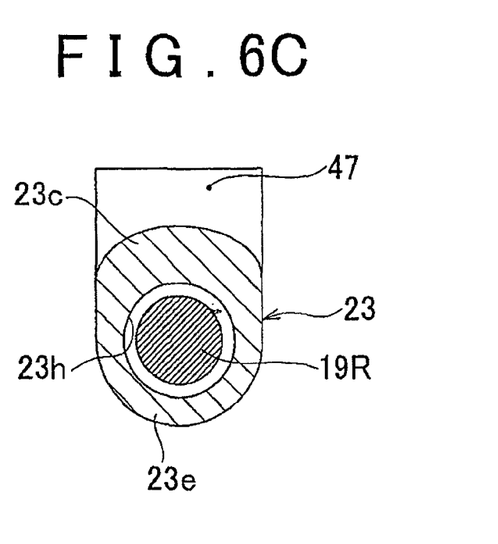

FIG. 6 is a sectional view of a portion near an end portion of a cylindrical portion of an oil pan, which is part of a vehicle engine structure according to a third embodiment of the invention.

The third embodiment is similar to the above-described first embodiment, except the form of the cylindrical portion of the oil pan near the end portions of the cylindrical portion. Thus, similar portions are indicated by the same reference numerals as those of the corresponding portions of the first embodiment, and description thereof is omitted. In the following description, differences between the first and third embodiments will be described.

FIG. 6A is a sectional view illustrating a portion near one end portion. The other end portion has a similar configuration. However, the invention is not limited to the case where each end portion has a similar configuration. The upper half portion 23*c* of the cylindrical portion 23 that is positioned over the driving axle 19R has an inclined surface 47, which is inclined from near the upper surfaces of the oil pan rail portions 21*a* and 21*b* downwardly toward the centre portion 23*d* of the cylindrical portion 23.

The inclination angle θ of the inclined surface 47 with respect to the joining surface 21*m*, or with respect to a line parallel to the joining surface 21*m* (the chain double-dotted line in FIG. 6A, for example) is large in an inclined area 47*h* between the centre portion 23*d* and both end portions 23*a* and 23*b* of the cylindrical portion 23, and is small near the centre portion 23*d* of the cylindrical portion 23.

Specifically, the outer end portion of the inclined surface 47 near the joining surface 21*m* of the oil pan rail portion 21*a* (21*b*) is such that an extension plane 21*e* flush with the joining surface 21*m* is formed, and the outer end portion of the inclined surface 47 sharply and continuously transitions from the extension plane 21*e* to the inclined surface in the inclined area 47*h*. Specifically, the inclination angle θ of the inclined surface 47 with respect to the joining surface 21*m* is an inclination angle θd of 10 degree or less, for example, near the centre portion 23*d* of the cylindrical portion 23, and is an inclination angle θa and an inclination angle θh that are both larger than the inclination angle θd, in the inclined area 47*h* between the centre portion 23*d* and both end portions 23*a* and 23*b* of the cylindrical portion 23 (θd<θa, θd<θb, θd<θh).

The inclination angle θ gradually decreases near an inner end portion 47*b*, out of both end portions 47*a* and 47*b* of the inclined surface 47. On the other hand, near the outer end portion 47*a* of the inclined surface 47, the inclined surface 47 joins the extension plane 21*e* of the joining surface 21*m* at a prescribed inclination angle θa, so that the inclined surface 47 smoothly joins the joining surface 21*m* and the centre portion 23*d* of the cylindrical portion 23 with no large step formed. It should be noted that this description is about the case of the right end portion 23*a*, and this also applies with regard to the left end portion 23*b* because this embodiment concerns the case where both end portions have a similar configuration.

FIG. 6A is a sectional view of the cylindrical portion 23. It is preferable that, in FIG. 6A, the curvature radius of the smoothly joining portions of the inclined surface 47 be greater than the thickness t of the lower half portion of the cylindrical portion 23, and greater than the thickness of the centre portion 23*d*.

The cross-sectional shape of the cylindrical portion 23 on the plane perpendicular to the axis of the cylindrical portion 23 near the end portion 23*a* (23*b*) of the cylindrical portion 23 is a vertically long shape that is offset so that the centre is positioned above the central axis of the through hole 23*h*. The cross-sectional shape has an outer profile such that the upper half portion 23*c* has a substantially rectangular shape of which corners have a certain radius, and that the lower half portion 23*e* has a substantially semicircular shape as shown in FIG. 6B. At a point closer to the centre portion 23*d* of the cylindrical portion 23 relative to both end portions 23*a* and 23*b* of the cylindrical portion 23, the cross-sectional shape has a substantially elliptical outer profile as shown in FIG. 6C.

The third embodiment also makes it possible to cause the cylindrical portion 23 of the oil pan 20 to provide a sufficient degree of reinforcement with the amount of padding to the upper half portion 23*c* of the cylindrical portion 23 kept small.

The inclination angle θ of the inclined surface 47 with respect to the joining surface 21*m*, or with respect to a line parallel to the joining surface 21*m* is small near the centre portion 23*d* of the cylindrical portion 23, and is large at both end portions 23*a* and 23*b* and in the inclined area 47*h* between the centre portion 23*d* and both end portions 23*a* and 23*b*, so that it is possible to cause the cylindrical portion 23 to provide a sufficient degree of reinforcement.

As described above, according to the embodiments of the invention, in the vehicle engine structure, one end portion or both end portions of the cylindrical portion of the oil pan through which the driving axle is passed are positioned near the oil pan rail portions to be fastened to the bottom of the engine body, and are allowed to function as reinforcement portions that effectively minimise deformation of the oil pan rail portions in a certain direction. Thus, it is possible to surely restrict vibration of the oil pan, and to prevent the emitted sound from becoming loud, without significant increase in mass of the engine or increase in cost for manufacturing the engine. The invention is useful when applied to a vehicle engine structure in which a driving axle for driving a driving wheel is passed through the oil pan mounted on the bottom of the engine.

While the invention has been described with reference to example embodiments thereof, it is to be understood that the invention is not limited to the example embodiments or constructions. To the contrary, the invention is intended to cover various modifications and equivalent arrangements. In addition, while the various elements of the example embodiments are shown in various combinations and configurations, which are example, other combinations and configurations, including more, less or only a single element, are also within the spirit and scope of the invention. For example, the sectional shapes and the forms of the inclined surface in the above embodiments may be used in various combinations.

The invention claimed is:
1. A vehicle engine structure, comprising:
a body of an engine; and
an oil pan, supported under the engine body, through which a driving axle driven by the engine to drive a driving wheel of a vehicle is passed, wherein the oil pan includes: a pair of oil pan rail portions, which are spaced apart from each other, and are fastened to the engine body; a pair of side wall portions, facing each other, which are formed integrally with the oil pan rail portions under the oil pan rail portions; and a cylindrical portion, which surrounds the driving axle, and is integrally joined with the pair of side wall portions near the pair of oil pan rail portions, wherein, at least one axial end of the cylindrical portion, with an upper half portion of the cylindrical portion positioned over the driving axle is thicker at a top portion up to a level near an upper surface of an adjacent one of the oil pan rail portions.

2. The vehicle engine structure according to claim 1, wherein at a position near the one end of the cylindrical portion, an outer profile of the cross section of the cylindrical portion has one of an elliptical shape, a shape obtained by reducing a lateral width of the upper half portion of the elliptical shape, and a shape in which a part corresponding to the upper half portion has a rectangular shape of which corners have a certain radius, and in which a part corresponding to a lower half portion of the cylindrical portion positioned below the driving axle has a semicircular shape.

3. The vehicle engine structure according to claim 1, wherein
the thickness of the upper half portion of the cylindrical portion in a vertical direction is greater than a thickness of a lower half portion of the cylindrical portion positioned below the driving axle in the vertical direction.

4. The vehicle engine structure according to claim 1, wherein
a lateral width of a cross section of a thickened portion of the upper half portion is equal to or less than a maximum lateral width of the cylindrical portion.

5. The vehicle engine structure according to claim 1, wherein
the upper half portion has an inclined surface inclined from near the upper surface of the adjacent one of the oil pan rail portions downwardly toward an axially centre portion of the cylindrical portion.

6. The vehicle engine structure according to claim 5, wherein an inclination angle of the inclined surface with respect to the upper surface of the adjacent one of the oil pan rail portions is larger at a position close to the one end of the cylindrical portion than the inclination angle at a position close to the axially centre portion of the cylindrical portion.

7. The vehicle engine structure according to claim 5, wherein
the inclination angle of the inclined surface with respect to the upper surface of the adjacent one of the oil pan rail portions is smaller at a position close to the one end of the cylindrical portion and at a position close to the axially centre portion of the cylindrical portion than the inclination angle in an inclined area between the one end of the cylindrical portion and the axially centre portion of the cylindrical portion.

8. The vehicle engine structure according to claims 5, wherein
an extension plane extended from the one end of the cylindrical portion toward the axially centre portion of the cylindrical portion at the same level as a level of the upper surface of the adjacent one of the oil pan rail portions is provided, and the inclined surface is formed so as to smoothly join the extension plane.

9. The vehicle engine structure according to claim 5, wherein the cross-sectional shape of the inclined surface taken on a plane perpendicular to an axis of the cylindrical portion at a position on an inner side at which the inclined surface joins the outer surface of the upper half portion is an arc shape, the cross-sectional shape of the inclined surface taken on a plane perpendicular to the axis of the cylindrical portion at a position on an outer side close to the oil pan rail portion is a rectangular shape of which corners have a certain radius, and, between the inner side and the outer side, from the centre portion of the cylindrical portion toward the oil pan rail portion, the cross-sectional shape of the inclined surface gradually varies from the arc shape to the rectangular shape of which corners have the certain radius.

10. The vehicle engine structure according to claim 1, wherein
the engine is a longitudinally-mounted engine, and the driving axle extends from a differential gear disposed on a side of the engine toward the driving wheel of the vehicle.

11. The vehicle engine structure according to claim 1, wherein
the oil pan includes: a block portion in which the pair of oil pan rail portions, the pair of side wall portions, and the cylindrical portion are integrally formed of a material the same as that of a cylinder block of the engine body; and a cover portion made of a steel plate, which covers a bottom of the block portion.

* * * * *